United States Patent Office 3,734,684
Patented May 22, 1973

---

3,734,684
FLAME RETARDANT PHOSPHORUS CONTAINING FIBROUS PRODUCTS AND METHOD FOR PRODUCTION
Darrell J. Donaldson, Metairie, Donald J. Daigle, New Orleans, George L. Drake, Jr., and Wilson A. Reeves, Metairie, and John V. Beninate, Gretna, La., assignors to the United States of America as represented by the Secretary of Agriculture
No Drawing. Filed May 7, 1971, Ser. No. 141,446
Int. Cl. D06m *13/28*
U.S. Cl. 8—183    13 Claims

ABSTRACT OF THE DISCLOSURE

Methylol phosphine, methylol phosphines in combination with nitrogenous compounds or water soluble adducts of the phosphine and nitrogenous compounds are used to treat organic fibrous derivatives containing primary and/or secondary amino groups such as wool, leather, nylon and aminized cottons, etc., to produce fibrous derivatives which are glow-, wrinkle-, rot- and shrink-resistant.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to flame retardant fibrous cellulosic and/or protein fiber containing phosphorus and nitrogen atoms and to a process for their production.

We have discovered that compounds which contain at least two hydroxymethyl groups attached to a trivalent phosphorus atom react in the presence or absence of formaldehyde with fibrous organic derivatives containing primary or secondary amino groups or both to produce fibrous organic derivatives containing phosphorus as well as nitrogen. Further, methylol phosphorus containing adducts can be used to produce thermosetting flame resistant polymers for production of flame resistant organic textiles. The term methylol phosphine adduct refers to soluble compounds produced by reacting tris(hydroxymethyl) phosphine with certain nitrogenous compounds. The methylol phosphines used in this invention are represented by the following structure:

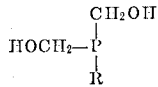

wherein R represents HOCH$_2$—, or H—, or alkyl, aryl, alicyclic, or heterocyclic groups and wherein phosphorus is trivalent. In the preferred methylol phosphine used in this invention R is a HOCH$_2$— group. When R is HOCH$_2$— the methylol phosphine is a white crystalline compound M.P. 58° C. and is soluble in water, alcohol, and other organic solvents.

The combustibility of these phosphorus and nitrogen containing organic fibers is lower than that of the original organic fibers, and the groups responsible for the lowered combustibility appear to be attached to the organic fibers by relatively strong bonds.

We have also discovered that when aminized cellulose is in contact with a mixture of tris(hydroxymethyl)phosphine and a nitrogenous compound consisting of melamine, guanidine, urea, thiourea and cyanamide, etc., the following reactions take place concurrently: The tris(hydroxymethyl)phosphine reacts with the amine group of the aminized cellulose as well as with the nitrogenous compound in the presence or absence of formaldehyde.

This invention is not limited to cellulose derivatives containing primary and/or secondary amino groups such as aminized cellulose but can also include other organic fibrous materials which contain

groups such as wool, leather, nylon, proteins and the like. In this grouping A represents H or an alkyl, aryl or alicyclic group, and B represents H or —CH$_2$OH.

In general, according to this invention organic fibers containing

groups are converted to fibrous organic derivatives containing phosphorus by reacting them with tris(hydroxymethyl)phosphine. Further, organic fibers containing

groups are converted to fibrous derivatives containing phosphorus and nitrogen atoms by reaction with a chemically bonded condensation polymer of tris(hydroxymethyl)phosphine and at least one nitrogenous compound of the group consisting of melamine, guanidine, urea, thiourea, cyanamide, etc.

Further, organic fibers containing

groups are converted to fibrous derivatives containing phosphorus and nitrogen atoms by reaction with a chemically bonded condensation polymer of tris(hydroxymethyl)phosphine and such nitrogenous compounds as above and formaldehyde.

Further, organic fibers containing

groups are converted to fibrous derivatives containing phosphorus and nitrogen atoms by impregnation with soluble phosphine adducts which are prepared by reacting tris(hydroxymethyl)phosphine either in the presence or absence of free formaldehyde with an essentially monomeric amide or amine in a suitable solvent. In order to make the soluble and useful adducts of this invention there must be an excess of methylol phosphorus radicals (—PCH$_2$OH) in the adduct. For purposes of the reaction tris(hydroxymethyl)phosphine is trifunctional; the functionality of the amine or amide is determined by the number of hydrogen or methylol radicals attached to trivalent nitrogen in the compound to be reacted with THP. Thus the adduct contains unreacted methylol phosphorus radicals. The adducts are essentially materials which contain the structure of the group consisting of:

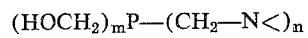

where $m$ and $n$ are integers of 1 or 2 and the sum of $m+n$ is 3.

This invention thus makes it possible to convert organic fibers which contain

groups, in the form of free fibers, textiles, or textile intermediates to fibers having special properties and having a degree of stiffness about comparable to the structure before treatment but having a lower combustibility better wrinkle-, rot-, mildew-resistance, and more dimension stability than either of the unmodified fibers. When the reaction product is leather, a tanning effect is obtained.

The fibrous derivatives provided by this invention are relatively durable to laundering and dry cleaning and like treatments and cause very little changes in their resistance to burning, mildew, rotting, dimensional stability and crease resistance. The derivatives are particularly suitable for use in the production of fabrics where reduced combustibility is desired.

Preferred fibers for conversion by the present process consist of spun aminoethylated cotton fibers (i.e., cotton yarns, threads, and fabrics which were aminoethylated before or after spinning, containing about from 0.3 to 1.5% nitrogen) wool, nylon and the like fibers, yarns or fabrics. Throughout this specification and claims, percent or parts refer to percentages or parts by weight.

The reaction of the aminized cellulose fibers, nylon, wool, protein fibers, leather, etc. with tris(hydroxymethyl)phosphine is preferably conducted by impregnating the fibers with an aqueous solution containing about from 5 to 35% of tris(hydroxymethyl)phosphine mechanically removing the excess liquid and curing the impregnated fabrics at about from 80° C. to 170° C. for about from 1½ minutes to 30 minutes, using the longer times with the lower temperature. The uncombined reagents are preferably removed from the cured fibers by water washing. The concentration of tris(hydroxymethyl)phosphine in the aqueous impregnating liquid and the curing times and temperatures can suitably be varied widely.

The reaction of the aminized cellulose fibers, wool, nylon, protein, leather, etc., concurrently with tris(hydroxymethyl)phosphine and with the nitrogenous compound is preferably conducted by: dissolving the nitrogenous compound and about from 1 to 2 parts of tris(hydroxymethyl)phosphine per part of nitrogen-containing group in about from 3 to 10 parts of water per part of total weight of nitrogenous compound and phosphine by agitation of a mixture of the nitrogenous compound, the phosphine, and water at about from 25° C. to 80° C.: impregnating the fibers with the resultant aqueous solutions and curing the impregnated fabrics at about from 80° C. to about 170° C. for about from 1½ minutes to 30 minutes using the longer times with the lower temperatures. Aqueous solutions are preferred but this invention is not limited to water systems; i.e., the reaction can be carried out in isopropyl alcohol, chlorinated hydrocarbons, THF etc. Catalyst systems generally used in attaching methylol compounds to fibers can also be used in these combinations. Examples of such catalysts are $MgCl_2$ $Zn(NO_3)_2$ and the amine hydrochlorides, etc. The reaction of the aminized nylon, wool, leather, protein and like fibers or fiber blends concurrently with tris(hydroxymethyl)phosphine and nitrogenous compounds and formaldehyde is preferably conducted by mixing tris(hydroxymethyl)phosphine with about an equal part of a water soluble partial (i.e., incompletely reacted) reaction product of the nitrogenous compound and formaldehyde, dissolving the resultant mixture in a weight of water about equal to the weight of the mixture and warming the solution until it has a viscosity slightly greater than that of water, impregnating the fibers with the solution so produced, and curing the impregnated fibers at about from 80 to 170° C. about from 3 to about 30 minutes using the longer times with the lower temperatures.

The reaction of the aminized cellulose fibers, wool, nylon, protein, leather or fiber blends with the tris(hydroxymethyl)phosphine nitrogenous compound adduct is preferably conducted by dissolving the adduct in water mechanically removing the excess liquid, and curing the impregnated fabrics at about from 80° to 170° C. for about from 1 to 30 minutes.

Surface active agents, water repellents, soil release agents, and other textile agents may be incorporated into the treating solution to impart additional properties to the fabric.

Although water is preferred, solvent systems, such as isopropanol, tetrahydrofuran trichloroethylene and the like can be used in this invention.

The following examples are illustrative of the invention:

EXAMPLE 1

Various organic fibrous materials were padded with solutions containing both THP and other organic compounds, dried at 85° C. for 1–4 minutes and cured at elevated temperatures for 2–10 minutes. All of the treated fabrics formed a black carbonaceous char when exposed to flame, indicating the presence of phosphorus. The type of materials used, solution composition, and dry and cure conditions and properties of the treated materials are outlined in the following table:

| Type of organic fibrous material treated | Soln. used [1] | Drying conditions time, min. | Cure conditions Temp., °C. | Time, min. | Match angle test, ° | Hand | Strength | Color |
|---|---|---|---|---|---|---|---|---|
| Aminized cotton | A | 1 | 160 | 4 | 75 | No change | Good | No change. |
| Wool | A | 2 | 160 | 3 | 180 | Good | do | Do. |
| Nylon [2] | A | 3 | 160 | 2 | | do | do | White. |
| Leather | A | 4 | 160 | 3 | 180 | No change | No change | No change. |
| Aminized cotton | B | 4 | 140 | 10 | 75 | do | Good | Do. |
| Wool | B | 3 | 140 | 10 | 180 | Good | do | Do. |
| Nylon [2] | B | 2 | 140 | 10 | | do | do | White. |
| Leather | B | 1 | 140 | 10 | 180 | No change | No change | No change. |
| Aminized cotton | C | 3 | 155 | 4 | 135 | do | Good | Do. |
| Wool | C | 3 | 155 | 4 | 180 | Fair | Fair | Do. |
| Nylon [2] | C | 3 | 155 | 4 | | Good | Good | White. |
| Leather | C | 3 | 155 | 4 | 180 | No change | No change | No change. |

[1] Description of solutions used.—A=20 parts THP, 80 parts $H_2O$; B=20 parts THP, 5 parts HCHO, 75 parts $H_2O$; C=20 parts THP, 8 parts TMM, 62 parts $H_2O$.
[2] Nylon sample resisted burning and melted with the formation of black carbonaceous char containing phosphorus.

EXAMPLE 2

Various organic fibrous materials were padded with solutions containing THP adducts, dried at 85° C. for 3 minutes and cured at elevated temperatures. All of the treated fabrics formed a black carbonaceous char when exposed to flame, indicating the presence of phosphorus. The type of materials used, solution composition, and cure conditions and the properties of the treated materials are outlined in the following table:

| Type of organic fibrous material treated | Soln. used¹ | Cure conditions Temp., °C. | Time, min. | Match angle test,° | Hand | Strength | Color |
|---|---|---|---|---|---|---|---|
| Aminized cotton | D | 160 | 4 | 145 | No change | Good | No change. |
| Wool | D | 160 | 4 | 180 | Good | do | Do. |
| Nylon ² | D | 110 | 10 | | do | do | White. |
| Leather | D | 160 | 4 | 180 | No change | No change | No change. |
| Wool | E | 155 | 4 | 180 | Good | Good | Do. |

¹ Description of solution used.—D=62 parts THP, 21 parts cyanamide, 111 parts H₂O (heated for 10 min.); E=31 parts THP, 15 parts urea, 95 parts H₂O (stood at room temperature for 4 hours).
² Nylon sample resisted burning and melted with the formation of black carbonaceous char containing phosphorous.

We claim:
1. A process for producing a flame resistant fibrous product comprising impregnating an amino group-containing fibrous organic material selected from the group consisting of aminized cotton containing about from 0.3 to 1.5 weight percent of nitrogen, wool, leather, and nylon with a 5 to 35 weight percent solution of a condensation polymer of tris(hydroxymethyl)phosphine and a nitrogenous compound selected from the group consisting of trimethylolmelamine, cyanamide, and urea, the tris(hydroxymethyl)phosphine and the nitrogenous compound being condensed in the ratio of 1 to 2 parts of tris(hydroxymethyl)phosphine per part of the nitrogen-containing group of the nitrogenous compound, and subsequently curing the thus-impregnated fibrous organic material at a temperature of about from 80° C. to 170° C. for about from 1.5 to 30 minutes, the shorter time intervals being employed with the higher curing temperatures.
2. The process of claim 1 wherein the amino group-containing fibrous organic material is aminized cotton containing about from 0.3 to 1.5 weight percent of nitrogen.
3. The process of claim 1 wherein the amino group-containing fibrous organic material is wool.
4. The process of claim 1 wherein the amino group-containing fibrous organic material is leather.
5. The process of claim 1 wherein the amino group-containing fibrous organic material is nylon.
6. The process of claim 1 wherein the nitrogenous compound is trimethylolmelamine.
7. The process of claim 1 wherein the nitrogenous compound is cyanamide.
8. The process of claim 1 wherein the nitrogenous compound is urea.
9. The product produced by the process of claim 1.
10. The product produced by the process of claim 2.
11. The product produced by the process of claim 6.
12. The product produced by the process of claim 7.
13. The product produced by the process of claim 8.

References Cited
UNITED STATES PATENTS

| | | | |
|---|---|---|---|
| 2,695,833 | 11/1954 | McMillan et al. | 117—136 |
| 2,937,207 | 5/1960 | Reuter et al. | 117—136 X |
| 3,030,421 | 4/1962 | Reuter et al. | 260—606.5 P |
| 3,213,042 | 10/1965 | Buckler et al. | 117—136 X |
| 3,268,360 | 8/1966 | Beninate et al. | 117—136 |

WILLIAM D. MARTIN, Primary Examiner

T. G. DAVIS, Assistant Examiner

U.S. Cl. X.R.

8—94.1 P, 116 P, 127.5, 128 R; 117—136, 138.8 N, 139.4, 141, 142, 143 A